United States Patent
Chen et al.

(10) Patent No.: US 10,225,561 B2
(45) Date of Patent: Mar. 5, 2019

(54) METHOD AND APPARATUS FOR SYNTAX SIGNALING IN IMAGE AND VIDEO COMPRESSION

(71) Applicant: MEDIATEK INC., Hsin-Chu (TW)

(72) Inventors: Li-Heng Chen, Tainan (TW); Tung-Hsing Wu, Chiayi (TW); Han-Liang Chou, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 322 days.

(21) Appl. No.: 15/210,903

(22) Filed: Jul. 15, 2016

(65) Prior Publication Data

US 2017/0105011 A1  Apr. 13, 2017

Related U.S. Application Data

(60) Provisional application No. 62/238,859, filed on Oct. 8, 2015, provisional application No. 62/271,503, filed on Dec. 28, 2015.

(51) Int. Cl.
*H04N 19/136* (2014.01)
*H04N 19/176* (2014.01)
*H04N 19/103* (2014.01)

(52) U.S. Cl.
CPC ......... *H04N 19/176* (2014.11); *H04N 19/103* (2014.11); *H04N 19/136* (2014.11)

(58) Field of Classification Search
CPC ............................ H04N 19/176; H04N 19/103
See application file for complete search history.

(56) References Cited

U.S. PATENT DOCUMENTS

| | | | | |
|---|---|---|---|---|
| 9,736,481 B2* | 8/2017 | Zhang | ................ | H04N 19/126 |
| 9,948,933 B2* | 4/2018 | Zhang | ................ | H04N 19/126 |
| 2005/0147295 A1* | 7/2005 | Kim | ................ | H04N 1/646 |
| | | | | 382/167 |
| 2005/0259730 A1* | 11/2005 | Sun | ................ | H04N 11/042 |
| | | | | 375/240.03 |
| 2006/0018559 A1* | 1/2006 | Kim | ................ | H04N 19/122 |
| | | | | 382/251 |
| 2007/0171490 A1* | 7/2007 | Cho | ................ | H04N 9/64 |
| | | | | 358/539 |
| 2009/0168894 A1* | 7/2009 | Marpe | ................ | H04N 9/67 |
| | | | | 375/240.24 |
| 2011/0255798 A1* | 10/2011 | Fujino | ................ | H04N 19/60 |
| | | | | 382/248 |

(Continued)

*Primary Examiner* — Jayanti K Patel
*Assistant Examiner* — Irfan Habib
(74) *Attorney, Agent, or Firm* — Winston Hsu

(57) ABSTRACT

A method and apparatus of coding using multiple coding modes with multiple color spaces are provided. For the encoder side, a coding mode is selected from a coding mode group. A corresponding color domain is associated with the coding mode and the corresponding color domain is selected from a color-domain group including at least two different color domains. The current coding unit is then encoded in the corresponding color domain using the coding mode. Furthermore, the syntax of the corresponding color domain is signaled in current coding unit syntaxes. The different color domains may include RGB color domain and YCoCg color domain. According to another method, if the midpoint prediction (MPP) mode is selected, a current block is color transformed into another color domain and the MPP coding process is performed in said another color domain.

18 Claims, 5 Drawing Sheets

(56) References Cited

U.S. PATENT DOCUMENTS

| | | | |
|---|---|---|---|
| 2011/0309958 A1* | 12/2011 | Yoo | H03M 7/3082 341/94 |
| 2013/0315493 A1* | 11/2013 | Sato | G06T 9/007 382/232 |
| 2014/0003497 A1* | 1/2014 | Sullivan | H04N 19/70 375/240.03 |
| 2014/0003515 A1* | 1/2014 | Ohgose | H04N 19/176 375/240.12 |
| 2014/0098857 A1* | 4/2014 | MacInnis | H04N 19/46 375/240.03 |
| 2014/0119454 A1* | 5/2014 | Hebei | H04N 19/147 375/240.18 |
| 2014/0233658 A1* | 8/2014 | Guerrero | G06T 9/00 375/240.26 |
| 2014/0376611 A1* | 12/2014 | Kim | H04N 19/176 375/240.02 |
| 2015/0063452 A1* | 3/2015 | Kim | H04N 19/176 375/240.12 |
| 2015/0195526 A1* | 7/2015 | Zhu | H04N 19/105 375/240.14 |
| 2015/0264354 A1* | 9/2015 | Zhang | H04N 19/126 375/240.03 |
| 2015/0264364 A1* | 9/2015 | Zhang | H04N 19/126 375/240.18 |
| 2015/0264402 A1* | 9/2015 | Zhang | H04N 19/126 375/240.18 |
| 2015/0264405 A1* | 9/2015 | Zhang | H04N 19/126 375/240.18 |
| 2016/0173906 A1* | 6/2016 | Lei | H04N 19/176 375/240.13 |
| 2016/0360235 A1* | 12/2016 | Ramasubramonian | H04N 19/86 |
| 2017/0111643 A1* | 4/2017 | Bugdayci Sansli | H04N 19/30 |
| 2017/0339418 A1* | 11/2017 | Ramasubramonian | H04N 19/136 |
| 2017/0359583 A1* | 12/2017 | Thirumalai | H04N 19/127 |
| 2018/0152721 A1* | 5/2018 | Rusanovskyy | H04N 19/176 |
| 2018/0302651 A1* | 10/2018 | Jacobson | H04N 19/65 |

\* cited by examiner

METHOD AND APPARATUS FOR SYNTAX SIGNALING IN IMAGE AND VIDEO COMPRESSION

CROSS REFERENCE TO RELATED APPLICATIONS

The present invention claims priority to U.S. Provisional Patent Application, Ser. No. 62/238,859, filed on Oct. 8, 2015 and U.S. Provisional Patent Application, Ser. No. 62/271,503, filed on Dec. 28, 2015. The U.S. Provisional patent applications are hereby incorporated by reference in their entireties.

BACKGROUND

Field of the Invention

The present invention relates to syntax signaling for an image or video coding system. In particular, the present invention relates to method and apparatus to signal syntax for a compression system which can compress video for transmission over display links.

Background and Related Art

Various video coding standards have been developed to reduce the required bitrate for video transmission or the required capacity for storage. For example, MPEG-2, MPEG-4 and AVC/H.264 have been widely used in various applications. In recent years, the coding efficiency has been substantially improved in newer video compression formats such as VP8, VP9 and the emerging HEVC (High Efficiency Video Coding) standards.

In various devices that involve video display, there is another type of application that requires data compression. In particular, display links connecting computers to monitors, set-top boxes to televisions, and application processors to display panels are digital interface formats widely used in the industry. Display links use digital interfaces. With the increasing demand for higher display resolutions and higher frame rates, the amount of data sent over display links becomes extremely high. For example, the display link between a set-box device and a 1080p HDTV at 120 Hz frame rate will require more than 7 Gbits/sec. For UHD (Ultra High Definition) TV, the required data will be four-fold higher. Therefore, display links are often in compressed formats. For example, DSC (Display Stream Compression) standard has been developed jointly by VESA (Video Electronics Standards Association) and MIPI Alliance to address the needs for data compression in display applications.

Due to different requirements, the DSC standard is different from popular video coding standards, such as MPEG-2/4, AVC/H.264 and HEVC. For example, the color space used for compression in display applications may be the YCoCg color space, instead of the YUV color space. Furthermore, DSC only includes Intra-frame compression without Inter-frame compression to minimize the processing delay and avoid the need for reference picture buffer. FIG. 1 illustrates an exemplary block diagram for a DSC encoder. As shown in FIG. 1, the DSC video encoder 100 includes a color-space converter 110, a buffer 115, a predictor/quantizer/reconstruction unit 120, a VLC entropy coding unit 125, a sub-stream multiplexing unit 130, a rate buffer 135, a flatness determination unit 140, a rate control unit 145, a line buffer 150, and an indexed color history (ICH) unit 155. If the input video data are in the RGB color format, the color-space converter 110 corresponds to a RGB-to-YCoCg color format converter. The information from the flatness determination unit 140 can be used to adjust the QP (quantization parameter) in the rate control unit 145. As shown in FIG. 1, the flatness indication is entropy coded using the VLC entropy coding unit 125 and incorporated in the bitstream. The color space is also referred as color domain in this disclosure.

Upon the growing needs for display links to support higher display resolutions and higher bit depth for color components, VESA initiated development efforts to establish a standard for Advanced Display Stream Compression (ADSC). Also, the ADSC supports native 4:2:0 and 4:2:2 coding to eliminate the need for converting pixels into RGB components. For example, ADSC allows more efficient compression in YCbCr 4:2:0 color sampling format. In addition, ADSC also supports High Dynamic Range (HDR) to accommodate the higher color depth in newer TV shows and movies.

The processing for display links often uses block-based compression, where a picture is divided into blocks and the compression is applied to each block. Furthermore, the compression settings may be applied to an image unit smaller than a picture. For example, Advanced DSC (ADSC) being developed is applied to slices of each picture and the target bitrate is imposed on each slice. Each slice is divided into coding units (i.e., blocks) and each coding unit consists of a block of N×M pixels, where N corresponds to block width and M corresponds to block height. According to ADSC, the characteristics of each block are evaluated in terms of "flatness", where the flatness of each block is categorized into five flatness types as follows:

Type: −1 denotes the "complex block"
Type: 0 denotes the "flat region"
Type: 1 denotes the "flat region (less flat than type 1)"
Type: 2 denotes the "complex to flat block"
Type: 3 denotes the "flat to complex block"

The flatness type is determined according to the complexity information of each block and its neighboring block. Flatness type influences the rate control behavior in each block. According to the existing ADSC draft standard, the syntax of flatness type is signaled in each coding unit.

According to ADSC, various coding modes are used for coding the blocks according to ADSC. The coding modes include Transform mode, DPCM mode, BP (block prediction) mode, Pattern mode, MPP (midpoint prediction) mode, and MPPF (MPP fallback) mode. Midpoint Prediction (MPP) mode uses a midpoint value as the predictor in each block. For example, the midpoint value can be determined by half of dynamic range of the pixels or mean value of the reconstructed block on the left side of the current block.

It is desirable to further improve the compression efficiency of the ADSC.

SUMMARY

A method and apparatus of coding using multiple coding modes with multiple color spaces are disclosed. For the encoder side, a coding mode is selected from a coding mode group. A corresponding color domain is associated with the coding mode and the corresponding color domain is selected from a color-domain group comprising at least two different color domains. The current coding unit is then encoded in the corresponding color domain using the coding mode. Furthermore, the syntax of the corresponding color domain is signaled in current coding unit syntaxes. The different color domains may include RGB color domain and YCoCg color domain.

For the decoder side, a coding mode is decoded from the bitstream for the current coding unit. A corresponding color domain for the current coding unit is determined from the bitstream, where the corresponding color domain is selected from a color-domain group comprising at least two different color domains. The current coding unit is then decoded from the bitstream using the coding mode decoded in the corresponding color domain.

A second method and apparatus of coding using multiple coding modes are disclosed. When a midpoint prediction mode is selected, a color transform is applied to convert the input pixel of a coding unit to another color domain different from the color domain of the input pixels. The midpoint prediction process is then applied to the color transformed coding unit. For the decoder side, the received bitstream corresponds to compressed data in the other color domain different from the color domain of the original input pixels. After the coding block is reconstructed in the other color domain, an inverse color transform is applied to convert the reconstructed input pixels to the original color domain.

A third method and apparatus of coding using multiple coding modes are disclosed. For the encoder side, flatness information of the current coding unit is determined and a coding mode is selected from a coding mode group. A condition for the current coding unit regarding whether to incorporate syntax of the flatness information of the current coding unit in current block syntaxes is determined. The current coding unit is encoded using the coding mode selected and the syntax of the flatness information of the current coding unit is signaled in current block syntaxes conditionally based on the condition. If the condition is true, the flatness information of the current coding unit is skipped from inclusion in the current block syntaxes; and if the condition is false, the flatness information of the current coding unit is included in the current block syntaxes. The condition can be related to flatness type of the current coding unit. For example, the condition is true if the flatness type of the current coding unit does not affect reconstructed pixel value or decoded pixel value of the current image unit, or the flatness type of the coding mode selected for the current coding unit is a fixed type.

In the decoder side for said another method, a coding mode is decoded from the bitstream for the current coding unit. If the coding mode belongs to a selected coding mode group, a flatness type for the current coding block is derived from the bitstream according to signaled flatness type in the bitstream. If the coding mode does not belong to the selected coding mode group, the flatness type for the current coding block is derived based on a default flatness type. The selected coding mode group may comprise one or more coding modes that require an encoder to signal syntax of flatness information of the current coding unit in the bitstream. The default flatness type may be set to a pre-determined flatness type before decoding a current picture starts and the pre-determined flatness type corresponds to Type: −1. The default flatness type may correspond to a pre-determined flatness type according to the coding mode decoded from the bitstream.

BRIEF DESCRIPTION OF THE DRAWINGS

FIG. 3A corresponds to the case that the condition is false. FIG. 3B corresponds to the case that the condition is true.

DETAILED DESCRIPTION

Figure 1:
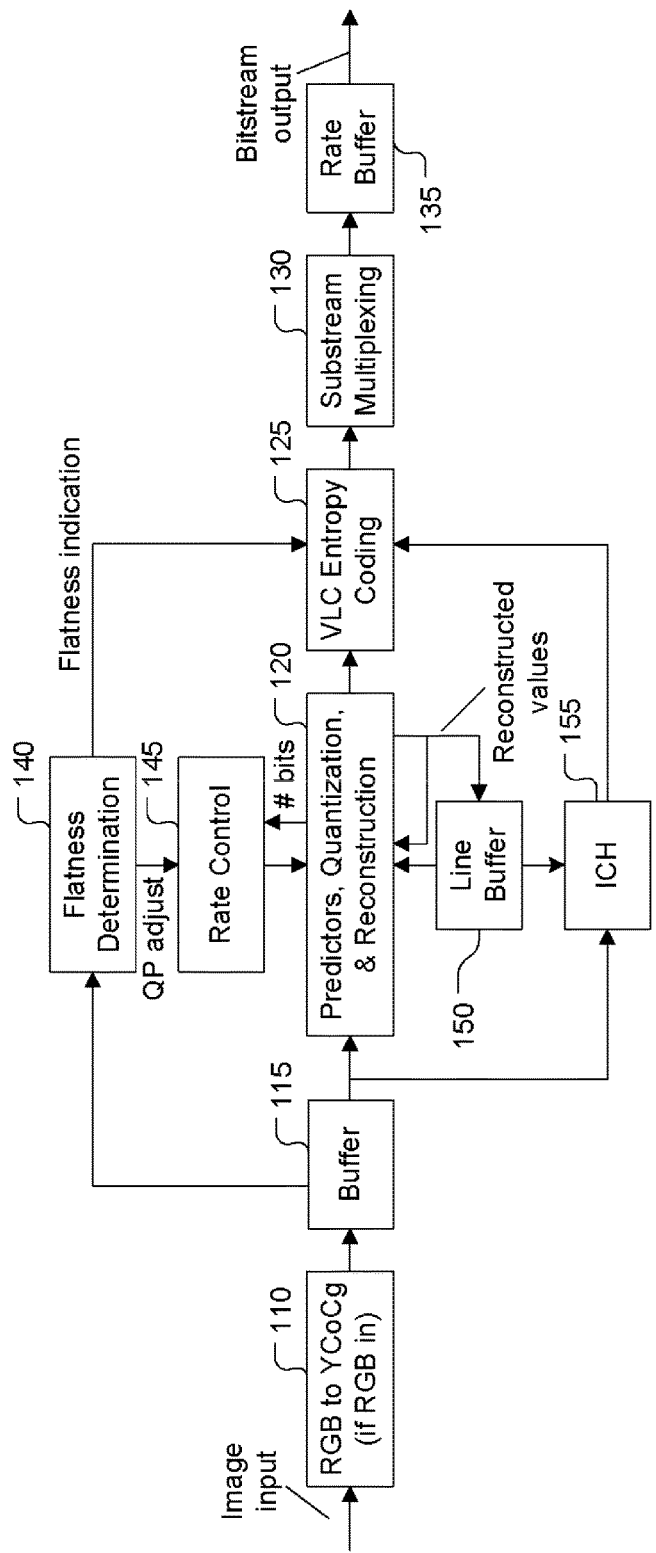
FIG. 1 illustrates an exemplary system block diagram based on the Display Stream Compression standard.

The following description is of the best-contemplated mode of carrying out the invention. This description is made for the purpose of illustrating the general principles of the invention and should not be taken in a limiting sense. The scope of the invention is best determined by reference to the appended claims.

According to the existing ADSC (Advanced Display Stream Compression) standard, the syntax of flatness type is signaled in each coding unit. In other words, some bandwidth will be required for syntax signaling of flatness type in every coding unit. Nevertheless, there may be cases that the flatness type is implied according to a certain prediction mode or a certain coding condition. Therefore, if a block is encoded in such mode or in such coding condition, the encoding mode or the coding condition already indicates the flatness type. Signaling flatness type for a coding unit encoded in the mode becomes redundant. Furthermore, there may be other situation that the information of flatness type is needed.

For advanced display stream compression, a reversible color transformation is often used, where coefficients of the color transform and the inverse color transform can be implemented using a small number of bits. For example, the YCoCg color format can be converted from the RGB color format using color transform coefficients represented by 0, 1, 1/2, and 1/4. While transformed color format such as YCoCg is suited for images from nature scenes, the transformed color format may not be always the best format for other types of image contents. For example, the RGB format may result in lower cross-color correlation for artificial images than images corresponding to a natural scene. Accordingly, multiple coding modes using different color formats can be applied for coding a block of pixels. For example, MPP mode and MPP Fallback (MPPF) mode may use the RGB color domain in the 444 color sampling format and the YCbCr color domain in the 422/420 color sampling formats.

First Method

According to an embodiment of the first method, syntax of the color space or color domain associated with the selected coding mode for the current coding unit is signaled in the current coding unit syntaxes. An encoder that incorporates the first method may use the slice as the image unit for applying coding parameters (e.g., bitrate). An input image is divided into one or more slices and each slice is coded independently of other slices. Each slice is divided into multiple coding units (i.e., blocks), where each block consists of N×M pixels, N represent the block width and M represent the picture height. A coding mode is selected from a set of coding modes and each coding mode is associated with a corresponding color domain selected from a group of color domains. The selected coding mode is then used to encode the current block in the corresponding color domain. The syntax of the corresponding color domain is signaled in the current coding unit syntaxes.

A decoder incorporating the first method of the present invention may decode the bitstream that comprises coding unit syntaxes associated with coding units in a slice. The decoder decodes the current coding mode from the coding unit syntaxes for the current coding unit, where the current coding mode is associated with a corresponding color domain. The decoder then determines the color domain for the current coding unit from the current coding unit syntaxes. The decoder then decodes the pixels of the current coding unit using the current coding mode in the corresponding color domain decoded.

Figure 2:
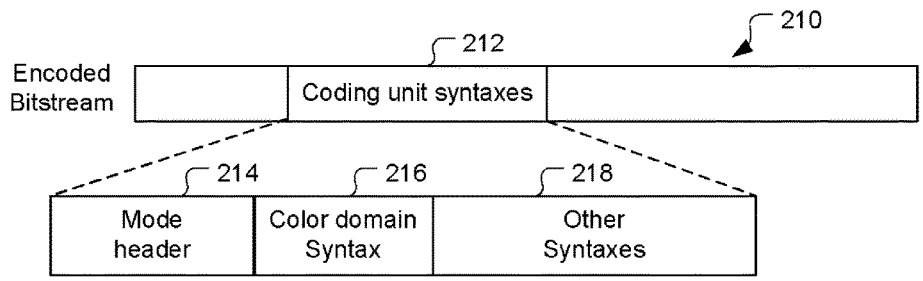
FIG. 2 illustrates an exemplary encoded bitstream according to an embodiment of the first method, where the color domain syntax for the current coding unit is incorporated in the current coding unit syntaxes.

FIG. 2 illustrates an exemplary encoded bitstream according to an embodiment of the first method, where the color domain syntax for the current coding unit is incorporated in the current coding unit syntaxes. In FIG. 2, the encoded bitstream 210 comprises a plurality of coding unit syntaxes including current coding unit syntaxes 212. The coding unit syntaxes 212 include a mode header 214. The color domain syntax 216 is signaled along with other syntaxes 218 for the current coding unit. The color domain may correspond to the RGB color domain or the YCoCg color domain.

Second Method

In the existing ADSC process, the MPP mode is applied to a block of input pixels in the color domain of the input pixels. The predictor of the coding unit is derived from the neighboring reconstructed block. The determined predictor for color channel is clipped to [middle, middle+2*bias], wherein the middle is related to the bit depth of input block and color channel of the color domain of the input pixels, and the bias is related to the quantization parameter (QP) and color channel of the input pixels. The residues are then quantized by reducing the bit depth of residue of one color channel, where the reduced bit depth is N bits and N is related to the QP value and color channel. For one color channel, the clipped residues are generated by clipping the quantized residues to the dynamic range of (M-N) bits, where M is the bit depth of the color channel. The clipped residues are encoded into the bitstream.

According to a second method of the present invention, a color transform is applied to the input pixels in a current coding unit when the MPP mode is selected for the current coding block. If the input pixels are in a first color domain and the color transform will convert the input pixels to a second color domain, where the second color domain is different from the first color domain. For example, the input pixels may be in the RGB color domain with 8 bits for each RGB color channels. If YCoCg is selected as the color domain when the MPP mode is selected, the color transform will convert input pixels in the RGB color domain to the YCoCg domain. The bit depth for the Y color channel can be 8 and the bit depth for the Co and Cg color channels can be 9. The midpoint value can be derived from the mean value of the left reconstructed block in the YCoCg-transformed color domain. The residues are calculated by subtracting the predictor (i.e., midpoint value) from the input block and the prediction process is performed in the YCoCg-transformed color domain. If QP is set to 2 and the reduced bit-depth N is 2/3/3 for Y/Co/Cg channel in the quantization process respectively, the remaining encoding process for the MPP mode is described as follows.

The middle value of Y channel is 128 and the middle value of Co/Cg channels is 0. The calculated midpoint value is clipped to [128, 128+2*bias$_Y$] for MP$_Y$, and [0, 0+2*bias$_{Co}$] and [0, 0+2*bias$_{Cg}$] for MP$_{Co}$ and MP$_{Cg}$ respectively, wherein MPx denotes the midpoint value of color channel x. The bias value is related to N, wherein bias is equal to 2, and bias$_{Co}$ and bias$_{Cg}$ are equal to 4 in this case. The dynamic range of the residue is [(0−(128+2*bias$_Y$)), (255−128)]=[−132, 127] for Y and [(−256−(0+2*bias$_{Co}$)), (255−0)]=[−264, 255] for Co, and also [−264, 255] for Cg. The residues are quantized by removing 2 least significant bits for Y and 3 least significant bits for Co and Cg respectively. The quantized residues are then clipped into (M−N)=6 bits to fit into the dynamic range [−32, 31]. The clipped 6-bit residues are encoded into bit-stream.

Third Method

According to a third method of the present invention, the flatness type syntax is included in the coding unit syntaxes adaptively depending on a test condition. If the condition is in the first state, the flatness type syntax is skipped (i.e., not included) in the coding unit syntaxes. If the condition is in the second state, the flatness type syntax is included in the coding unit syntaxes. For example, the first state may correspond to "true" and the second state may correspond to "false". Alternatively, the first state may correspond to "false" and the second state may correspond to "true".

An encoder that incorporates the third method may use the slice as the image unit for applying coding parameters (e.g., bitrate). An input image is divided into one or more slices and each slice is coded independently of other slices. Each slice is divided into multiple coding units (i.e., blocks), where each block consists of N×M pixels, N represent the block width and M represent the picture height. A coding mode is selected from a set of coding modes and the selected coding mode is then used to encode the current block. A condition is determined and the syntax associated with the flatness type is skipped from inclusion in the coding unit syntaxes signaled for the current coding unit if the condition is true. Otherwise (i.e., the condition being "false"), the syntax associated with the flatness type is included in the coding unit syntaxes signaled for the current coding unit.

The condition can be related to the flatness of a current coding unit (i.e., block). For example, if the flatness type of the coding unit does not affect the reconstructed pixel value, the condition can be set to "true". In another example, if the flatness type of the coding unit does not affect the decoded pixel value, the condition can be set to "true". In yet another example, if the flatness type of the coding unit is a fixed type, the condition can be set to "true". In another case, the condition can be related to the coding mode used for the coding unit.

A decoder incorporating the third method of the present invention may decode the bitstream that comprises coding unit syntaxes associated with coding units in a slice. The decoder determines the coding mode from the coding unit syntaxes for the current coding unit. The decoder then decodes the flatness type syntax for the current coding unit according to the decoded coding mode. If the decoded coding mode belongs to a selected mode group, the flatness type is derived from the flatness syntax signaled in the bitstream. If the decoded coding mode does not belong to the selected mode group, the flatness type is determined as a default flatness type.

The selected mode group includes one or more coding modes that require the encoder to signal the extra flatness syntax for the coding unit. The default flatness type may correspond to a pre-determined flatness type before decoding the current coding unit. For example, the default flatness type can be set to Type: −1 for decoding an image.

Figure 3A:
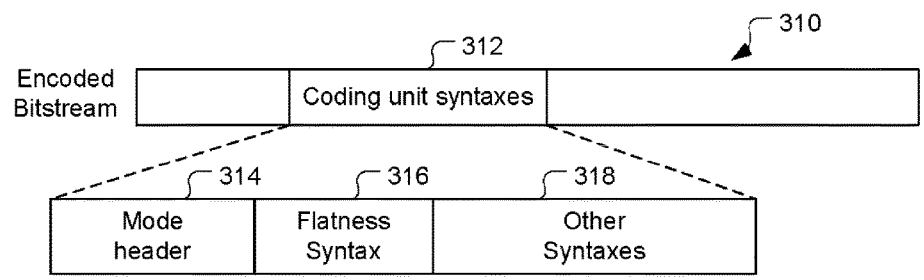
FIG. 3A and FIG. 3B illustrate an exemplary encoded bitstream according to an embodiment of the third method, where the flatness syntax for the current coding unit is adaptively incorporated depending on the condition.
Figure 3B:
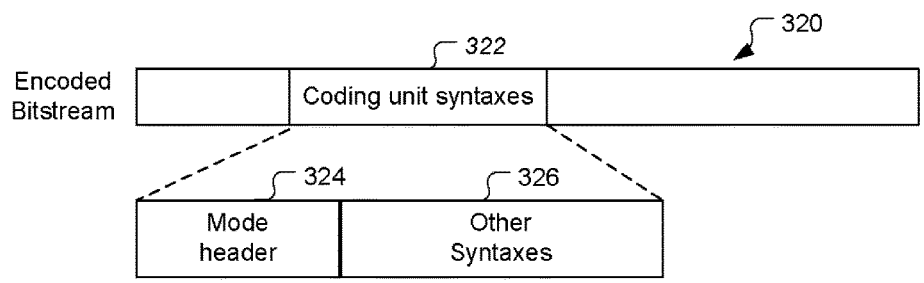

FIG. 3A and FIG. 3B illustrate an exemplary encoded bitstream according to an embodiment of the third method, where the flatness syntax for the current coding unit is adaptively incorporated. In FIG. 3A, the encoded bitstream 310 comprises a plurality of coding unit syntaxes including current coding unit syntaxes 312. The coding unit syntaxes 312 include a mode header 314. FIG. 3A corresponds to the case that the condition is false. Therefore, the flatness syntax 316 is signaled along with other syntaxes 318 for the current coding unit. In FIG. 3B, the encoded bitstream 320 comprises a plurality of coding unit syntaxes including current coding unit syntaxes 322. The coding unit syntaxes 322 include a mode header 324. FIG. 3B corresponds to the case that the condition is true. Therefore, only other syntaxes 326 for the current coding unit are signaled without the flatness syntax.

Figure 4:
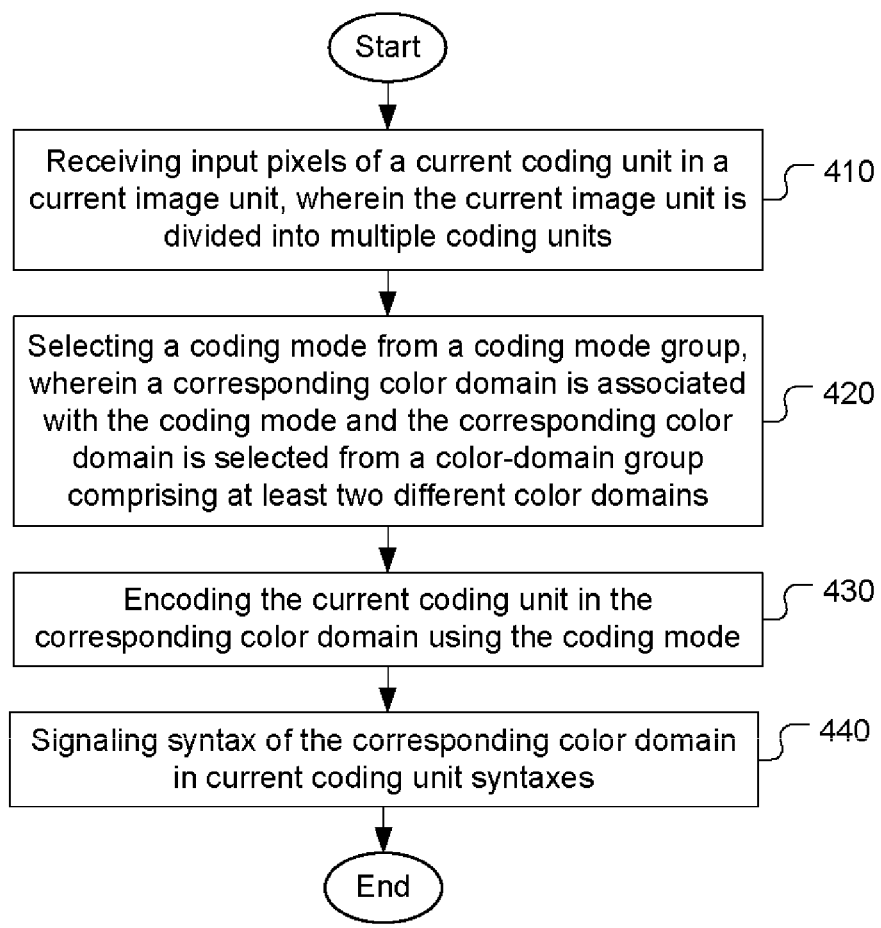
FIG. 4 illustrates an exemplary flowchart of a video encoder using multiple coding modes with multiple color spaces, where the syntax of color domain is signaled in the bitstream.

FIG. 4 illustrates an exemplary flowchart of a video encoder using multiple coding modes with multiple color spaces, where the syntax of color domain is signaled in the bitstream. The encoder receives input pixels of a current coding unit in a current image unit in step 410, where the current image unit is divided into multiple coding units. A coding mode is selected from a coding mode group in step 420, where a corresponding color domain is associated with the coding mode and the corresponding color domain is selected from a color-domain group comprising at least two different color domains. The current coding unit in the corresponding color domain is encoded using the coding mode in step 430. The syntax of the corresponding color domain is signaled in current coding unit syntaxes in step 440. The flowchart for a corresponding decoder can be developed similarly.

Figure 5:
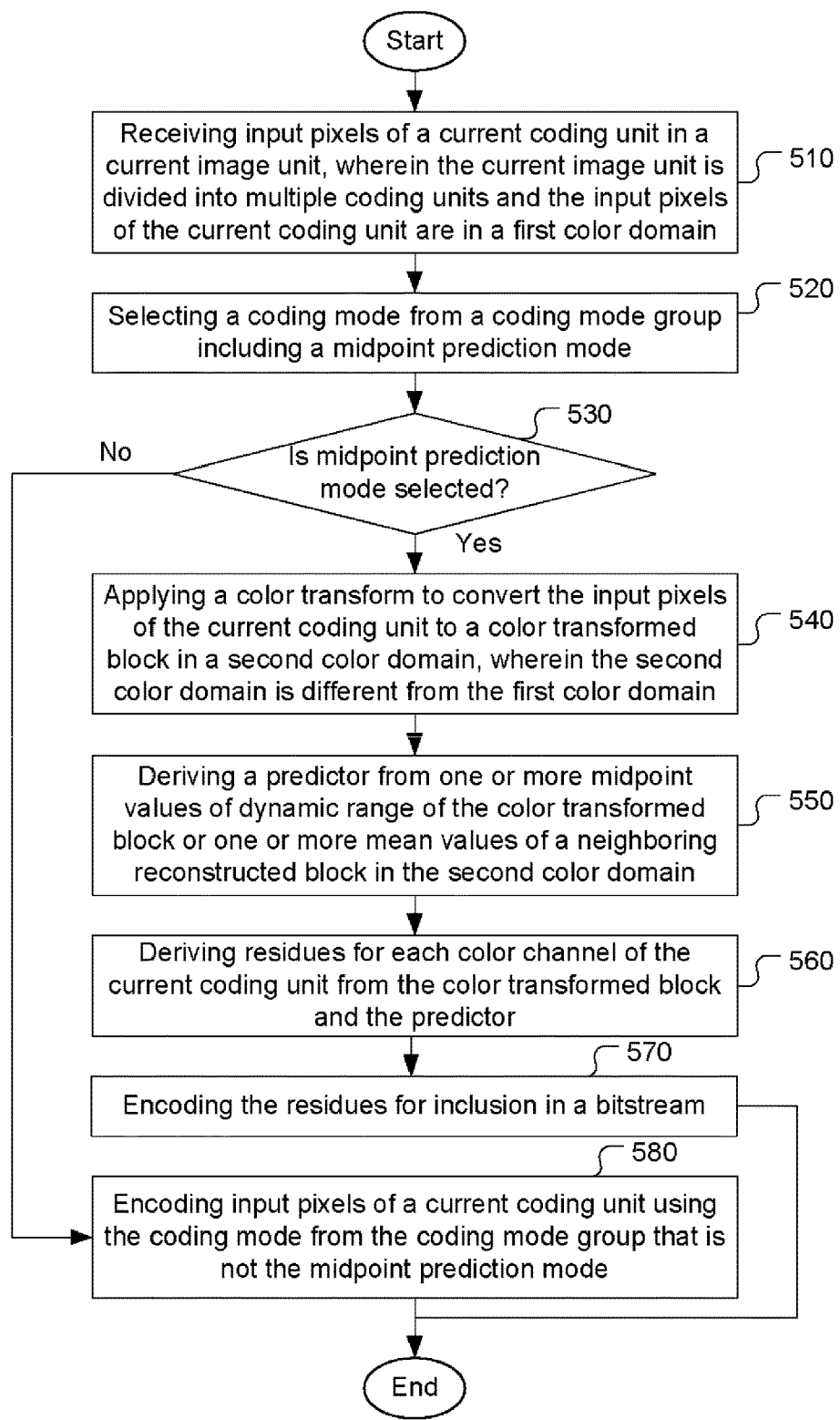
FIG. 5 illustrates an exemplary flowchart of another video encoder using multiple coding modes, where the midpoint prediction mode is applied in another color domain different from the color domain of the input pixels.

FIG. 5 illustrates an exemplary flowchart of a video encoder using multiple coding modes with multiple color spaces, where the syntax of color domain is signaled in the bitstream. The encoder receives input pixels of a current coding unit in a current image unit in step 510, where the current image unit is divided into multiple coding units and the input pixels of the current coding unit are in a first color domain. A coding mode is selected from a coding mode group including a midpoint prediction mode in step 520. Whether the midpoint prediction mode is selected to encode the input pixels of the current coding unit is checked in step 530. If the check result is "yes", steps 540, 550, 560 and 570 are performed. If the check result is "no", step 580 is performed. In step 540, a color transform is applied to convert the input pixels of the current coding unit to a color transformed block in a second color domain, where the second color domain is different from the first color domain. In step 550, a predictor is derived from one or more midpoint values of dynamic range of the color transformed block or one or more mean values of a neighboring reconstructed block in the second color domain. In step 560, residues are derived for each color channel of the current coding unit from the color transformed block and the predictor. In step 570, the residues are encoded for inclusion in a bitstream. In step 580, the input pixels of a current coding unit are encoded using the coding mode from the coding mode group that is not the midpoint prediction mode.

Figure 6:
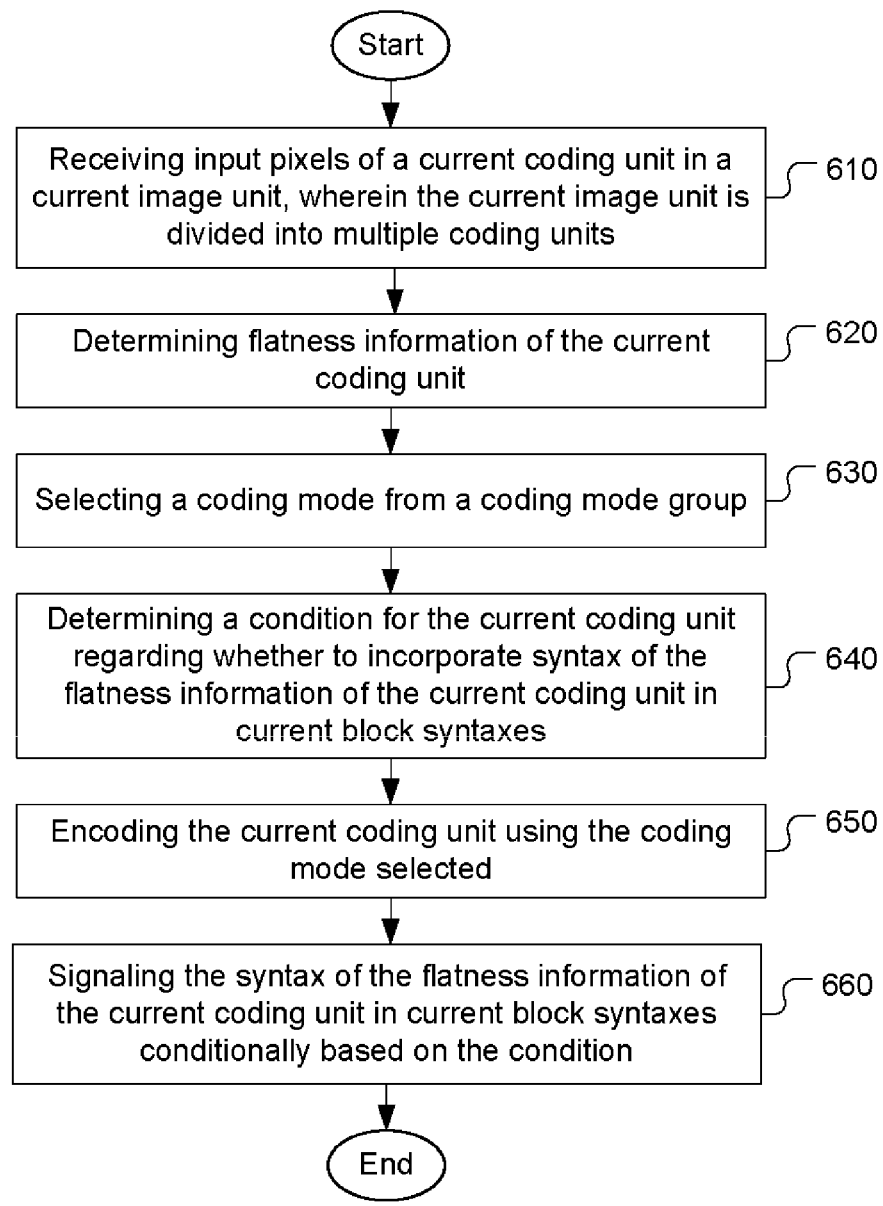
FIG. 6 illustrates an exemplary flowchart of a video encoder using multiple coding modes, where the syntax of flatness type is signaled in the bitstream adaptively depending on the condition.

FIG. 6 illustrates an exemplary flowchart of a video encoder using multiple coding modes, where the syntax of flatness type is signaled in the bitstream adaptively depending on the condition. The encoder receives input pixels of a current coding unit in a current image unit in step 610, where the current image unit is divided into multiple coding units. The flatness information of the current coding unit is determined in step 620 and a coding mode is selected from a coding mode group in step 630. A condition for the current coding unit regarding whether to incorporate syntax of the flatness information of the current coding unit in current block syntaxes is determined in step 640. The current coding unit is encoded using the coding mode selected in step 650. The syntax of the flatness information of the current coding unit is signaled in current block syntaxes conditionally based on the condition in step 660. The flowchart for a corresponding decoder can be developed similarly.

The flowcharts shown above are intended to illustrate examples of video coding incorporating an embodiment of the present invention. A person skilled in the art may modify each step, re-arrange the steps, split a step, or combine the steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

What is claimed is:

1. A method of video encoding using multiple coding modes with multiple color spaces, the method comprising:

receiving input pixels of a current coding unit in a current image unit, wherein the current image unit is divided into multiple coding units;

selecting a coding mode from a coding mode group, wherein the coding mode is a midpoint prediction mode that is arranged to derive a predictor from at least one midpoint value of dynamic range of the current coding unit or at least one mean value of a neighboring reconstructed block, a corresponding color domain is associated with the coding mode and the corresponding color domain is selected from a color-domain group comprising at least two different color domains;

encoding the current coding unit in the corresponding color domain using the coding mode; and signaling syntax of the corresponding color domain in current coding unit syntaxes.

2. The method of claim 1, wherein said at least two different color domains include RGB color domain and YCoCg color domain.

3. An apparatus for video encoding using multiple coding modes with multiple color spaces, the apparatus comprising one or more electronic circuits or processors arranged to:

receive input pixels of a current coding unit in a current image unit, wherein the current image unit is divided into multiple coding units;

select a coding mode from a coding mode group, wherein the coding mode is a midpoint prediction mode that is arranged to derive a predictor from at least one midpoint value of dynamic range of the current coding unit or at least one mean value of a neighboring reconstructed block, a corresponding color domain is associated with the coding mode and the corresponding color domain is selected from a color-domain group comprising at least two different color domains;

encode the current coding unit in the corresponding color domain using the coding mode; and signal syntax of the corresponding color domain in current coding unit syntaxes.

4. A method of video decoding using multiple coding modes with multiple color spaces, the method comprising:

receiving a bitstream corresponding to compressed video data including input pixels of a current coding unit in a current image unit, wherein the current image unit is divided into multiple coding units;

decoding a coding mode from the bitstream for the current coding unit, wherein the coding mode is a midpoint prediction mode that is arranged to derive a predictor from at least one midpoint value of dynamic range of the current coding unit or at least one mean value of a neighboring reconstructed block;

determining a corresponding color domain for the current coding unit from the bitstream, wherein the corresponding color domain is selected from a color-domain group comprising at least two different color domains; and decoding a current coding unit from the bitstream using the coding mode decoded in the corresponding color domain.

5. The method of claim 4, wherein said at least two different color domains include RGB color domain and YCoCg color domain.

6. An apparatus for video decoding using multiple coding modes with multiple color spaces, the apparatus comprising one or more electronic circuits or processors arranged to:

receive a bitstream corresponding to compressed video data including input pixels of a current coding unit in a current image unit, wherein the current image unit is divided into multiple coding units;

decode a coding mode from the bitstream for the current coding unit, wherein the coding mode is a midpoint prediction mode that is arranged to derive a predictor from at least one midpoint value of dynamic range of the current coding unit or at least one mean value of a neighboring reconstructed block;

determine a corresponding color domain for the current coding unit from the bitstream; and decode a current coding unit from the bitstream using the coding mode decoded in the corresponding color domain.

7. A method of video encoding using multiple coding modes with multiple color spaces, the method comprising:

receiving input pixels of a current coding unit in a current image unit, wherein the current image unit is divided into multiple coding units and the input pixels of the current coding unit are in a first color domain;

selecting a coding mode from a coding mode group including a midpoint prediction mode; and if the midpoint prediction mode is selected to encode the input pixels of the current coding unit:

applying a color transform to convert the input pixels of the current coding unit to a color transformed block in a second color domain, wherein the second color domain is different from the first color domain;

deriving a predictor from one or more midpoint values of dynamic range of the color transformed block or one or more mean values of a neighboring reconstructed block in the second color domain;

deriving residues for each color channel of the current coding unit from the color transformed block and the predictor; and encoding the residues for inclusion in a bitstream.

8. The method of claim 7, wherein the first color domain corresponds to RGB color domain and the second color domain corresponds to YCoCg color domain.

9. A method of video decoding using multiple coding modes with multiple color spaces, the method comprising:

receiving a bitstream corresponding to compressed video data including input pixels of a current coding unit in a current image unit, wherein the current image unit is divided into multiple coding units and the input pixels of the current coding unit are in a first color domain;

decode a coding mode from the bitstream for the current coding unit, wherein the coding mode belongs to a coding mode group including a midpoint prediction mode;

if the coding mode decoded is the midpoint prediction mode:

deriving residues from the bitstream for each color channel of the current coding unit in a second color domain for the current coding unit;

deriving a predictor corresponding to one or more midpoint values of dynamic range of the color transformed block or one or more mean values of a neighboring reconstructed block in the second color domain;

reconstructing a color transformed block in the second color domain based on the residues derived for each color channel of the current coding unit and the predictor; and applying an inverse color transform to convert the color transformed block in the second color domain into the input pixels of the current coding unit in a first color domain, wherein the first color domain is different from the second color domain.

10. The method of claim 9, wherein the first color domain corresponds to RGB color domain and the second color domain corresponds to YCoCg color domain.

11. A method of video encoding using multiple coding modes, the method comprising:
receiving input pixels of a current coding unit in a current image unit, wherein the current image unit is divided into multiple coding units;
determining flatness information of the current coding unit;
selecting a coding mode from a coding mode group;
determining a condition for the current coding unit regarding whether to incorporate syntax of the flatness information of the current coding unit in current block syntaxes that are included in an encoded bitstream generated by said video encoding;
encoding the current coding unit using the coding mode selected; and
signaling the syntax of the flatness information of the current coding unit in the current block syntaxes included in the encoded bitstream conditionally based on the condition.

12. The method of claim 11, wherein if the condition is true, the flatness information of the current coding unit is skipped from inclusion in the current block syntaxes; and if the condition is false, the flatness information of the current coding unit is included in the current block syntaxes.

13. The method of claim 12, wherein the condition is related to flatness type of the current coding unit.

14. The method of claim 13, wherein the condition is true if the flatness type of the current coding unit does not affect reconstructed pixel value or decoded pixel value of the current image unit, or the flatness type of the coding mode selected for the current coding unit is a fixed type.

15. A method of video decoding using multiple coding modes, the method comprising:
receiving a bitstream corresponding to compressed video data including input pixels of a current coding unit in a current image unit, wherein the current image unit is divided into multiple coding units;
decoding a coding mode from the bitstream for the current coding unit;
if the coding mode belongs to a selected coding mode group, deriving a flatness type for the current coding block from the bitstream according to signaled flatness type in the bitstream; and
if the coding mode does not belong to the selected coding mode group, deriving the flatness type for the current coding block based on a default flatness type, wherein the flatness type for the current coding block is not signaled via the bitstream.

16. The method of claim 15, wherein the selected coding mode group comprises one or more coding modes that require an encoder to signal syntax of flatness information of the current coding unit in the bitstream.

17. The method of claim 15, wherein the default flatness type is set to a pre-determined flatness type before decoding a current picture starts and the pre-determined flatness type corresponds to Type: −1.

18. The method of claim 15, wherein the default flatness type corresponds to a pre-determined flatness type according to the coding mode decoded from the bitstream.

* * * * *